US011192454B2

(12) United States Patent
Nagaoka et al.

(10) Patent No.: US 11,192,454 B2
(45) Date of Patent: Dec. 7, 2021

(54) VEHICLE CONTROL APPARATUS (71) Applicant: SUBARU CORPORATION, Tokyo (JP)

(72) Inventors: Nobusuke Nagaoka, Tokyo (JP); Yoshihiro Nakazato, Tokyo (JP); Yosuke Kubota, Tokyo (JP); Junichi Kato, Tokyo (JP); Taiki Sakai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 231 days.

(21) Appl. No.: 16/518,212

(22) Filed: Jul. 22, 2019

(65) Prior Publication Data
US 2020/0094692 A1 Mar. 26, 2020

(30) Foreign Application Priority Data
Sep. 25, 2018 (JP) .............................. JP2018-178648

(51) Int. Cl.
*B60L 15/00* (2006.01)
*B60L 50/60* (2019.01)
(Continued)

(52) U.S. Cl.
CPC ............. *B60L 15/007* (2013.01); *B60L 50/51* (2019.02); *B60L 50/60* (2019.02); *B60W 50/14* (2013.01); *B60W 50/16* (2013.01); *G08G 1/0967* (2013.01); *B60K 6/22* (2013.01); *B60L 2210/40* (2013.01); *B60L 2240/66* (2013.01);
(Continued)

(58) Field of Classification Search
CPC ........ B60L 15/007; B60L 50/60; B60L 50/51; B60L 2210/40; B60L 2240/66; B60L 2240/68; B60W 50/14; B60W 50/16; B60W 2050/0026; B60W 2050/143; B60W 2420/42; B60W 2510/081;
(Continued)

(56) References Cited

U.S. PATENT DOCUMENTS 5,485,381 A 1/1996 Heintz et al.
9,415,768 B2 * 8/2016 Okada ................. B60L 15/2009
(Continued)

FOREIGN PATENT DOCUMENTS

EP 1 067 669 A2 1/2001
JP 06-507746 A 9/1994
(Continued)

OTHER PUBLICATIONS

Japanese Notice of Reasons for Refusal issued in corresponding Japanese Patent Application No. 2018-178648, dated Jun. 2, 2020, with English translation.

*Primary Examiner* — Gertrude Arthur Jeanglaude
(74) *Attorney, Agent, or Firm* — McDermott Will & Emery LLP (57) ABSTRACT A vehicle control apparatus includes an inverter controller. The inverter controller holds a plurality of control maps for an inverter. The inverter supplies electric power to a drive motor. The drive motor drives a drive wheel of the vehicle. The inverter controller selects any one of the plurality of control maps on a basis of a notification instruction that instructs to notify a driver of information. The inverter controller controls an operation of the inverter on a basis of the control map selected.

13 Claims, 9 Drawing Sheets (51) Int. Cl.
  *G08G 1/0967* (2006.01)
  *B60W 50/14* (2020.01)
  *B60W 50/16* (2020.01)
  *B60L 50/51* (2019.01)
  *B60K 6/22* (2007.10)
  *B60W 50/00* (2006.01)

(52) U.S. Cl.
  CPC .. *B60L 2240/68* (2013.01); *B60W 2050/0026* (2013.01); *B60W 2050/143* (2013.01); *B60W 2420/42* (2013.01); *B60W 2510/081* (2013.01); *B60W 2510/083* (2013.01); *B60Y 2200/91* (2013.01); *B60Y 2200/92* (2013.01)

(58) Field of Classification Search
  CPC . B60W 2510/083; G08G 1/0967; B60K 6/22; B60Y 2200/91; B60Y 2200/92
  USPC .......................................................... 701/22
  See application file for complete search history.

(56) References Cited

U.S. PATENT DOCUMENTS

| | | | | |
|---|---|---|---|---|
| 2011/0254956 | A1* | 10/2011 | Ishikawa | B60W 40/08 348/148 |
| 2012/0109515 | A1* | 5/2012 | Uyeki | G01C 21/3469 701/423 |

FOREIGN PATENT DOCUMENTS

| | | |
|---|---|---|
| JP | 2001-025258 A | 1/2001 |
| JP | 2005-130614 A | 5/2005 |
| JP | 2008-090748 A | 4/2008 |
| JP | 2009-081991 A | 4/2009 |
| JP | 2010-049535 A | 3/2010 |
| JP | 2011-024349 A | 2/2011 |

* cited by examiner

VEHICLE CONTROL APPARATUS

CROSS-REFERENCE TO RELATED APPLICATIONS

The present application claims priority from Japanese Patent Application No. 2018-178648 filed on Sep. 25, 2018, the entire contents of which are hereby incorporated by reference.

BACKGROUND

The technology relates to a vehicle control apparatus that controls a vehicle including an inverter.

Some vehicles, such as automobiles including electric vehicles and hybrid electric vehicles, generate driving force using a drive motor. For example, Japanese Unexamined Patent Application Publication No. 2011-024349 discloses a hybrid vehicle that drives a motor on the basis of a map for setting a control mode.

SUMMARY

An aspect of the technology provides a vehicle control apparatus that controls a vehicle. The vehicle control apparatus includes an inverter controller. The inverter controller is configured to: hold a plurality of control maps for an inverter that supplies electric power to a drive motor, in which the drive motor is configured to drive a drive wheel of the vehicle; select any one of the plurality of control maps on the basis of a notification instruction that instructs to notify a driver of information; and control an operation of the inverter on the basis of the any one of the control maps selected.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In the following, some embodiments of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

A driver of a vehicle receives various pieces of information from the vehicle and makes various decisions on driving operation on the basis of the received information. Therefore, it is desired for a vehicle to properly notify the driver of information.

It is desirable to provide a vehicle control apparatus that properly notify a driver of information.

EXAMPLE EMBODIMENTS

[Example Configuration]

Figure 1:
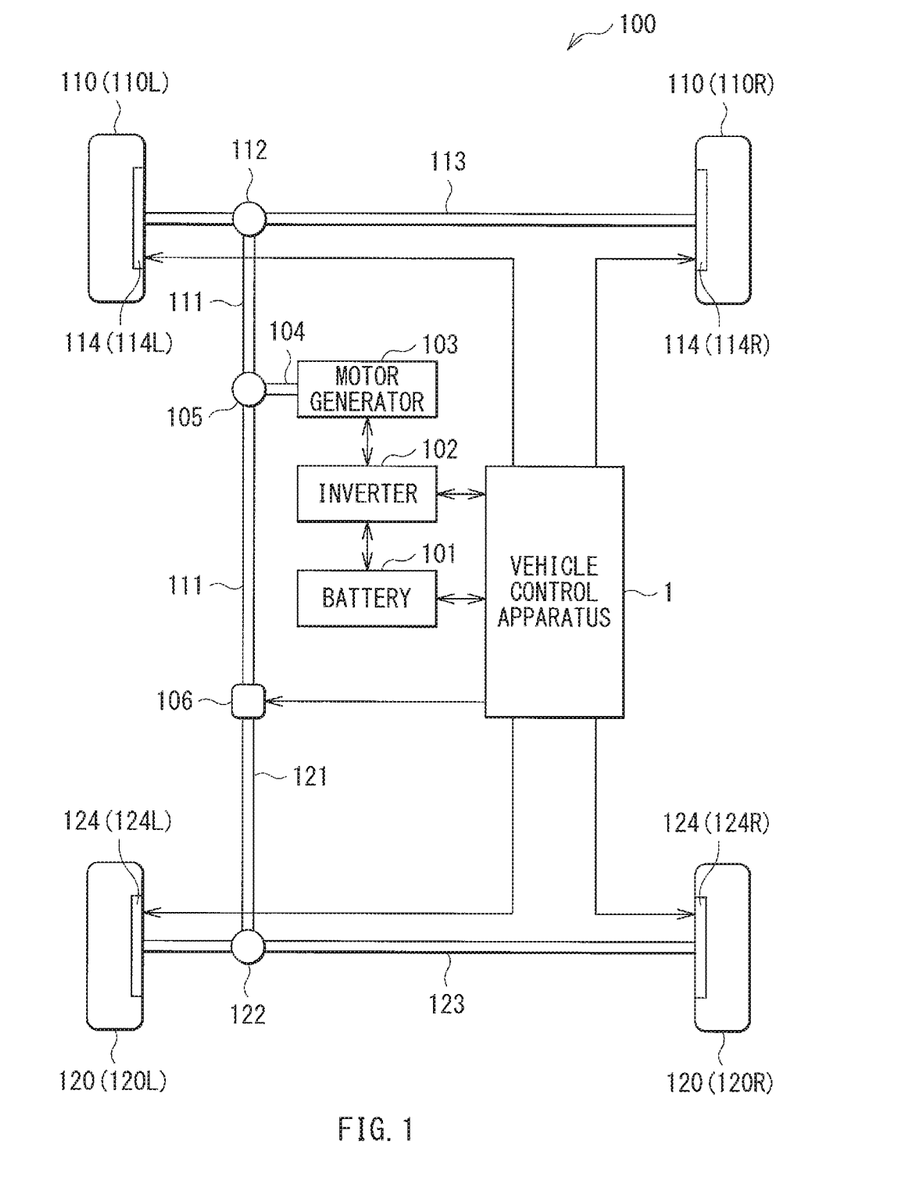
FIG. 1 is a diagram illustrating an example configuration of a vehicle that includes a vehicle control apparatus according to one example embodiment of the disclosure.
Figure 2:
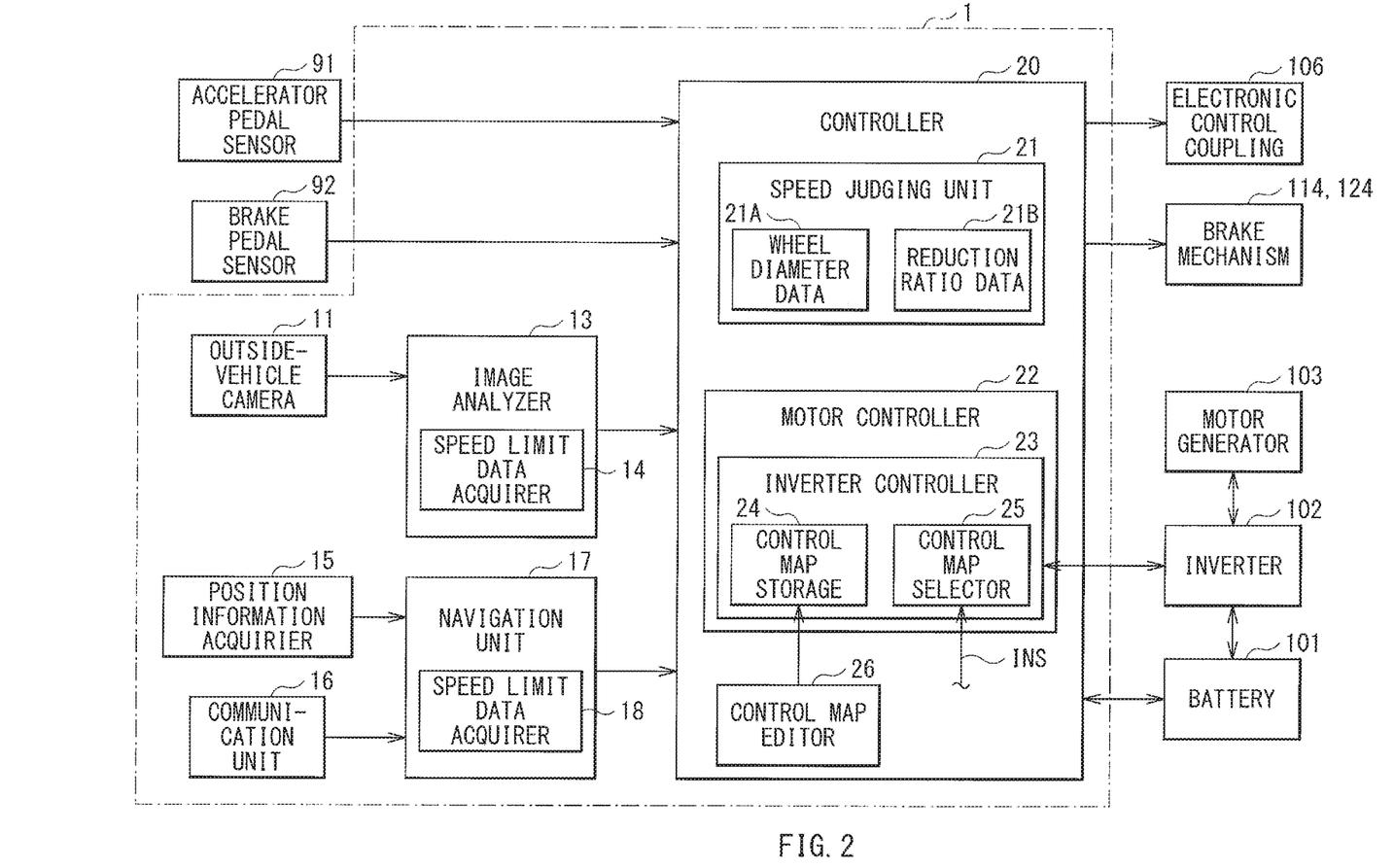
FIG. 2 is a block diagram illustrating an example configuration of the vehicle control apparatus illustrated in FIG. 1.

FIG. 1 illustrates an example mechanism in a vehicle 100 that includes a vehicle control apparatus 1 according to an example embodiment of the technology. The mechanism may generate driving force and transmit the generated driving force. FIG. 2 illustrates an example configuration in a control mechanism of the vehicle 100. The vehicle 100 may be an electric-powered vehicle such as an electric vehicle. The vehicle control apparatus 1 may change the way of controlling an inverter in the vehicle 100 to generate a sound or a vibration to notify a driver of information.

As illustrated in FIG. 1, the vehicle 100 may include a battery 101, an inverter 102, a motor generator 103, a shaft 104, a gear mechanism 105, propeller shafts 111 and 121, an electronic control coupling 106, differential mechanisms 112 and 122, drive shafts 113 and 123, two front wheels 110 (110L and 110R), two brake mechanisms 114 (114L and 114R), two rear wheels 120 (120L and 120R), two brake mechanisms 124 (124L and 124R), and the vehicle control apparatus 1.

The battery 101 may hold electric power and supply direct-current (DC) power to the inverter 102. The battery 101 may be under the control of the vehicle control apparatus 1.

The inverter 102 may generate alternating-current (AC) power on the basis of the DC power received from the battery 101, and may supply the generated AC power to the motor generator 103. The inverter 102 may be under the control of the vehicle control apparatus 1.

The motor generator 103 may serve as a power source that generates mechanical energy or driving force on the basis of the AC power received from the inverter 102. The motor generator 103 may also serve as a power generator that generates regenerative energy upon braking of the vehicle 100.

The shaft 104 may transmit, to the gear mechanism 105, the driving force generated by the motor generator 103.

The gear mechanism 105 may transmit, to the propeller shaft 111, the driving force received through the shaft 104.

The propeller shaft 111 may transmit, to the differential mechanism 112, the driving force received through the gear mechanism 105. The propeller shaft 111 may also transmit, through the electronic control coupling 106 to the propeller shaft 121, the driving force received through the gear mechanism 105.

On the basis of an instruction from the vehicle control apparatus 1, the electronic control coupling 106 may transmit, to the propeller shaft 121, the driving force received through the propeller shaft 111. This allows the vehicle 100 to adjust a ratio of the torque of the driving force transmitted to the respective front wheels 110L and 110R to the torque of the driving force transmitted to the respective rear wheels 120L and 120R.

The propeller shaft 121 may transmit, to the differential mechanism 122, the driving force received through the electronic control coupling 106.

The differential mechanism 112 may transmit, to the drive shaft 113 coupled to the front wheels 110L and 110R, the driving force received through the propeller shaft 111. Likewise, the differential mechanism 122 may transmit, to the drive shaft 123 coupled to the rear wheels 120L and 120R, the driving force received through the propeller shaft 121.

The brake mechanism 114L may generate braking force on the front wheel 110L, and the brake mechanism 114R may generate braking force on the front wheel 110R. Likewise, the brake mechanism 124L may generate braking force on the rear wheel 120L, and the brake mechanism 124R may generate braking force on the rear wheel 120R. The brake mechanisms 114L, 114R, 124L, and 124R may each include a disc brake or a drum brake, for example, and may operate in accordance with an instruction from the vehicle control apparatus 1.

As illustrated in FIG. 2, the vehicle 100 may further include an accelerator pedal sensor 91 and a brake pedal sensor 92. When an operator operates a non-illustrated accelerator pedal, the accelerator pedal sensor 91 may detect a stepping quantity of the driver's operation on the accelerator pedal, and may supply the result of the detection to the vehicle control apparatus 1. When the operator operates a non-illustrated brake pedal, the brake pedal sensor 92 may detect a stepping quantity of the driver's operation on the brake pedal, and may supply the result of the detection to the vehicle control apparatus 1.

The vehicle control apparatus 1 may include an outside-vehicle camera 11, an image analyzer 13, a position information acquirer 15, a communication unit 16, a navigation unit 17, and a controller 20.

The outside-vehicle camera 11 may capture an image of an environment in front of the vehicle 100. In an example embodiment where the vehicle 100 has a stereo camera that detects a distance between the vehicle 100 and a preceding vehicle, the stereo camera may serve as the outside-vehicle camera 11.

The image analyzer 13 may perform an image analyzing process on the basis of the image captured by the outside-vehicle camera 11. The image analyzer 13 may include a speed-limit data acquirer 14.

On the basis of the image captured by the outside-vehicle camera 11, the speed-limit data acquirer 14 may identify a traffic sign that is installed on a road on which the vehicle 100 is traveling and indicates the speed limit of the road. Hereinafter, the road on which the vehicle 100 is traveling may also referred to as a "road of the vehicle 100". On the basis of the traffic sign identified, the speed-limit data acquirer 14 may acquire information on the speed limit. The speed-limit data acquirer 14 may supply the information on the speed limit to the controller 20.

The position information acquirer 15 may acquire position data regarding a coordinate of the vehicle 100 on the ground through the Global Positioning System (GPS) or another global navigation satellite system (GNSS), for example.

The communication unit 16 may be coupled to a server that distributes, for example but not limited to, traffic information via wireless communication, such as Long-Term Evolution (LTE) or a wireless local area network (LAN).

The navigation unit 17 may determine a traveling route to a destination along which the vehicle 100 is to travel, on the basis of a map information database DB accommodated therein, for example. The navigation unit 17 may thereafter present the driver with the information on the traveling route to guide the vehicle 100 to travel along the determined traveling route. In this example embodiment, the navigation unit 17 may determine the traveling route on the basis of the map information database DB accommodated therein. However, it should be understood that the example embodiments is a mere example of embodiments of the technology. In another example embodiment, the navigation unit 17 may determine the traveling route on the basis of map information database held in a non-illustrated server. The navigation unit 17 may include a user interface UI including, for example but not limited to, a display panel, a touch panel, or various keys. The navigation unit 17 having such a configuration may determine the traveling route to the destination on the basis of the information on the destination received from the user interface UI operated by the driver, for example, and may present the driver with the information on the determined traveling route using the user interface UI. The navigation unit 17 may include a speed-limit data acquirer 18.

The speed-limit data acquirer 18 may acquire, on the basis of the map information database DB, the information on the speed limit of the road on which the vehicle 100 is traveling. The speed-limit data acquirer 18 may supply the controller 20 with the acquired information on the speed limit.

The controller 20 may include a plurality of electronic controllers (ECUs). The plurality of ECUs may include, for example but not limited to, an ECU that controls the overall operation of the vehicle 100, an ECU that controls an operation of the motor generator 103, an ECU that controls an operation of the battery 101, and an ECU that controls operations of the brake mechanisms 114 and 124. The controller 20 may control operations of the inverter 102, the brake mechanisms 114 and 124, the electronic control coupling 106, the battery 101, and another component on the basis of the results of the detections by the accelerator pedal sensor 91 and the brake pedal sensor 92. The controller 20 may include a speed judging unit 21, a motor controller 22, and a control map editor 26.

The speed judging unit 21 may determine the traveling speed of the vehicle 100 through comparing the traveling speed of the vehicle 100 with the speed limit of the road of the vehicle 100 acquired by the speed-limit data acquirers 14 and 18. For example, the speed judging unit 21 may first convert the acquired speed limit into a motor revolution number Nth of the motor generator 103 using, for example, wheel diameter data 21A on the diameters of the front wheels 110 and the rear wheels 120 and reduction ratio data 21B on the reduction ratios at the gear mechanism 105 and the differential mechanisms 112 and 122. The speed judging unit 21 may compare an actual motor revolution number N of the motor generator 103 with the motor revolution number Nth to compare the traveling speed with the speed limit. For example, when the traveling speed of the vehicle 100 below the speed limit is approaching the speed limit or when the traveling speed of the vehicle 100 exceeds the speed limit, the speed judging unit 21 may generate a notification instruction INS. When the traveling speed is lowered enough below the speed limit afterwards, the speed judging unit 21 may cancel the notification instruction INS.

The motor controller 22 may control the motor generator 103. The motor controller 22 may include an inverter controller 23. The motor controller 22 may calculate, on the basis of the result of the detection by the accelerator pedal sensor 91 or any other data, a command value of the motor revolution number N of the motor generator 103 and a command value of the motor torque T of the motor generator 103. On the basis of the command value of the motor revolution number N and the command value of the motor torque T, the inverter controller 23 may control the inverter 102 using a control map M.

Figure 3A:
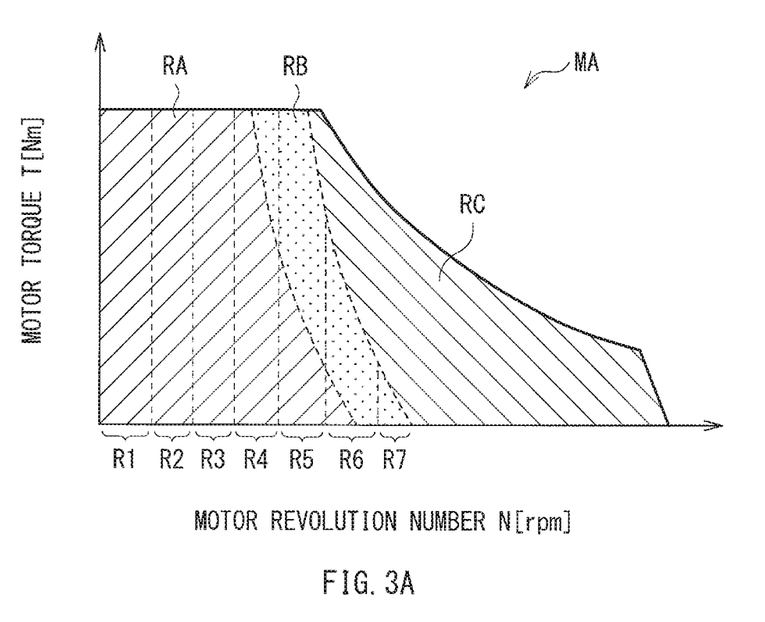
FIG. 3A is a diagram illustrating an example control map according to one example embodiment of the disclosure.
Figure 3B:
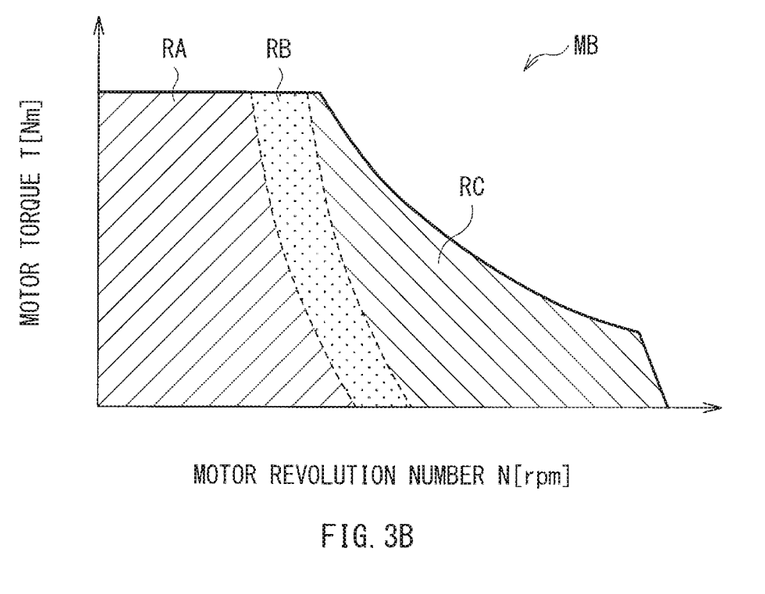
FIG. 3B is a diagram illustrating another example control map according to one example embodiment of the disclosure.

FIG. 3A illustrates a control map MA that is one example of the control map M, and FIG. 3B illustrates a control map MB that is another example of the control map M. In FIGS. 3A and 3B, the horizontal axis represents the command value of the motor revolution number N, and the vertical axis represents the command value of the motor torque T.

On the basis of the command value of the motor revolution number N and the command value of the motor torque T of the control map M, the inverter controller 23 may control the inverter 102 through pulse width modulation (PWM) control, overmodulation PWM control, or rectangular wave control. In an example condition where respective operating points indicated by the command value of the motor revolution number N and the command value of the motor torque T belong to a PWM control region RA as illustrated in FIGS. 3A and 3B, the inverter controller 23 may control the inverter 102 through the PWM control. Likewise, in an example condition where respective operating points indicated by the command value of the motor revolution number N and the command value of the motor torque T belong to an overmodulation PWM control region RB, the inverter controller 23 may control the inverter 102 through the overmodulation PWM control. In an example condition where respective operating points indicated by the command value of the motor revolution number N and the command value of the motor torque T belong to a rectangular wave control region RC, the inverter controller 23 may control the inverter 102 through the rectangular wave control. The PWM control may be executed when the traveling speed is at a low level. The overmodulation PWM control may be executed when the traveling speed is at a middle level. The rectangular wave control may be executed when the traveling speed is at a high level. In other words, the control maps M may include information on a correspondence relation of data on the motor torque T of the motor generator 103 and data on the number of revolutions of the motor generator 103 versus the control modes of the inverter 102.

Figure 4A:
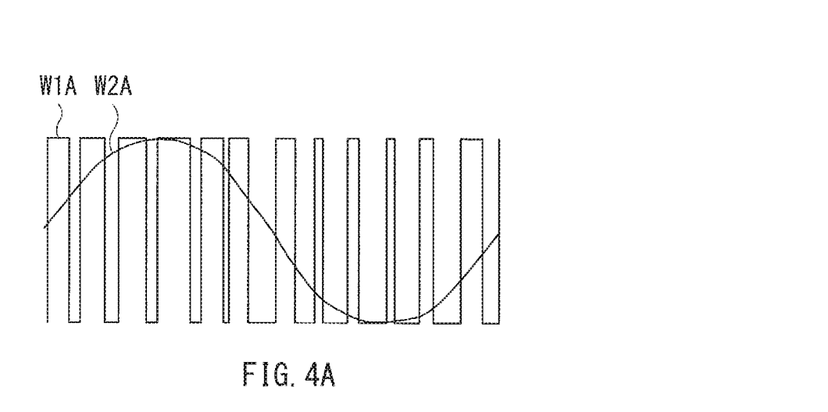
FIG. 4A is a diagram illustrating an example PWM control according to one example embodiment of the disclosure.
Figure 4B:
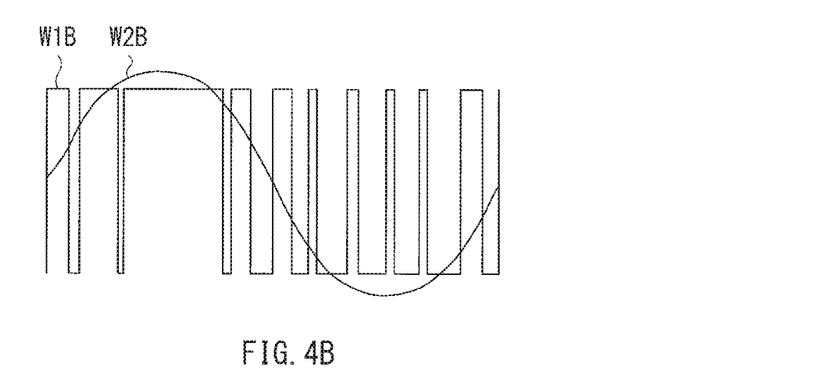
FIG. 4B is a diagram illustrating an example overmodulation PWM control according to one example embodiment of the disclosure.
Figure 4C:
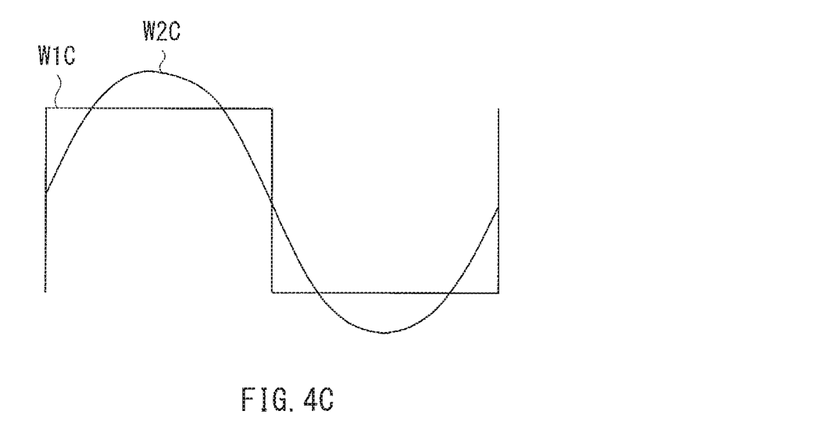
FIG. 4C is a diagram illustrating an example rectangular wave control according to one example embodiment of the disclosure.

FIG. 4A illustrates an example of the PWM control, FIG. 4B illustrates an example of the overmodulation PWM control, and FIG. 4C illustrates an example of the rectangular wave control. In FIGS. 4A to 4C, a waveform W1 (i.e., waveforms W1A, W1B, and W1C) may represent a waveform of an output signal from a switching unit in the inverter 102, and a waveform W2 (i.e., waveforms W2A, W2B, and W2C) may represent a waveform of an AC output signal from the inverter 102. The waveform W1 may have an amplitude corresponding to the voltage of a DC power supplied from the battery 101.

During the PWM control illustrated in FIG. 4A, the inverter 102 may generate a switching control signal on the basis of a carrier signal having a carrier frequency fc. The switching control signal may be used to control an operation of the switching unit in the inverter 102. The switching unit may perform a switching operation on the basis of the switching control signal to generate an output signal having the waveform W1A. The output signal may be a so-called PWM signal. The inverter 102 may remove high-frequency components in the PWM signal to generate an AC output signal having the waveform W2A. In the PWM control, the inverter controller 23 may control the operation of the inverter 102 so that the waveform of the AC output signal becomes a sinusoidal waveform including fundamental wave components. The inverter 102 may supply the AC output signal to the motor generator 103.

During the overmodulation PWM control illustrated in FIG. 4B, the inverter 102 may generate a switching control signal on the basis of a carrier signal having a carrier frequency fc. An output signal having the waveform W1B may be generated from the switching unit on the basis of the switching control signal, and an AC output signal having the waveform W2B may be generated on the basis of the output signal. In the overmodulation PWM control, the inverter controller 23 may control the operation of the inverter 102 so that the waveform of the AC output signal includes harmonic components, such as third harmonic components, as well as fundamental wave components. This allows the modulation factor in the overmodulation PWM control to be higher than that in the PWM control illustrated in FIG. 4A, increasing the amplitude of the AC output signal.

During the rectangular wave control illustrated in FIG. 4C, the inverter 102 may generate a switching control signal without using a carrier signal. An output signal having the waveform W1C may be generated from the switching unit on the basis of the switching control signal. The output signal may be a rectangular wave signal having a duty ratio of about 50%. The inverter 102 may remove high-frequency components in the rectangular wave signal to generate an AC output signal having the waveform W2C. This allows the AC output signal to have a larger amplitude in the rectangular wave control than in that in the overmodulation PWM control illustrated in FIG. 4B.

In the control map MA illustrated in FIG. 3A, a bind region including the PWM control region RA and the overmodulation PWM control region RB may be divided into seven subregions R1 to R7. Different carrier frequencies fc may be allocated to these subregions R1 to R7. In this example illustrated in FIG. 3A, the inverter controller 23 may identify, from the subregions R1 to R7 in the control map MA, any one of the subregions to which the operation points indicated by the command value of the motor revolution number N and the command value of the motor torque T belong. The inverter controller 23 may control the inverter 102 using the carrier frequency fc allocated to the identified subregion.

In the control map MB illustrated in FIG. 3B, a single carrier frequency fc may be allocated to a bind region including the PWM control region RA and the overmodulation PWM control region RB. In the example illustrated in FIG. 3B, the inverter controller 23 may control the inverter 102 using the single carrier frequency fc allocated to the control map MB.

As described above, the inverter controller 23 may control the inverter 102 through the PWM control, the overmodulation PWM control, or the rectangular wave control, on the basis of the command value of the motor revolution number N and the command value of the motor torque T of the control map M. The inverter controller 23 may include a control map storage 24 and a control map selector 25.

The control map storage 24 may hold a plurality of control maps M. The control map storage 24 may include a non-volatile memory, for example.

Figure 5:
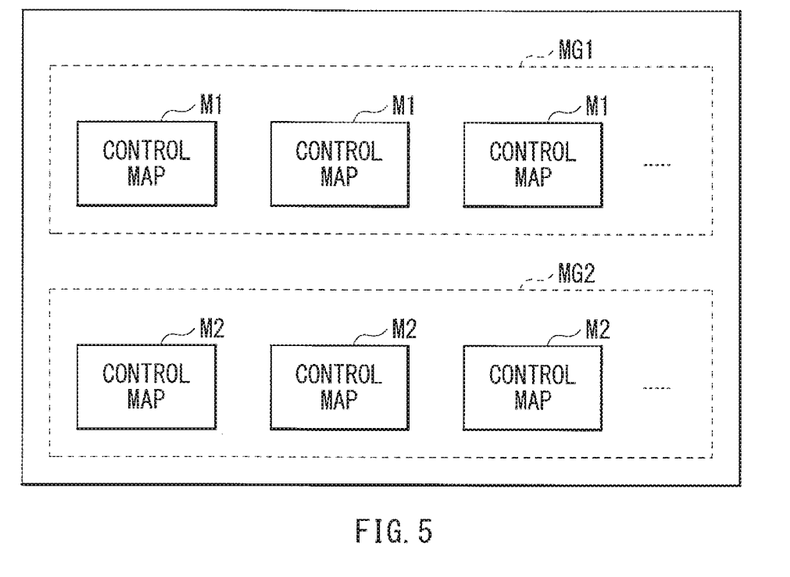
FIG. 5 is a diagram illustrating example control maps held in a control map storage illustrated in FIG. 2.

FIG. 5 illustrates the control maps M held in the control map storage 24. In an example illustrated in FIG. 5, the control maps M may be divided into two groups including a map group MG1 and a map group MG2.

The control maps M belonging to the map group MG1 (hereinafter referred to as "control maps M1") may be used in a normal operation. The control maps M1 may be provided corresponding to the voltage of the DC power supplied from the battery 101 to the inverter 102, for example.

The control maps M belonging to the map group MG2 (hereinafter referred to as "control maps M2") may be used in a notifying operation in which a sound or a vibration is generated to notify the driver of information. The control maps M2 may be provided corresponding to the voltage of the DC power supplied from the battery 101 to the inverter 102, for example.

The control maps M2 belonging to the map group MG2 may be configured to cause the vehicle 100 to generate a sound or a vibration larger than those generated on the basis of the control maps M1 belonging to the map group MG1. In other words, when the inverter controller 23 controls the inverter 102 on the basis of the control map M, the inverter 102 may generate an AC power, and the motor generator 103 may generate driving force on the basis of the AC power. The driving force may be transmitted to the front wheels 110 through the shaft 104, the gear mechanism 105, the propeller shaft 111, the differential mechanism 112, and the drive shaft 113. The driving force may also be transmitted to the rear wheels 120 through the propeller shaft 121, the differential mechanism 122, and the drive shaft 123. This allows the vehicle 100 to generate a sound or a vibration in accordance with the control map M. The control maps M2 may be configured to cause the vehicle 100 to generate a sound or a vibration larger than those generated on the basis of the control maps M1. For example, the carrier frequency fc of the control map M2 may be lower than the carrier frequency fc of the control map M1. The carrier frequency fc of the control map M2 may be within an audible frequency range of human ear, for example. The driver may feel that the sound or vibration generated by the use of the control maps M2 are larger than those generated by the use of the control maps M1. In this way, the vehicle 100 notifies the driver of information.

The control map selector 25 may select, any one of the control maps M to be used, from the control maps M held in the control map storage 24. For example, in the normal operation, the control map selector 25 may select, on the basis of the voltage of the DC power supplied from the battery 101 to the inverter 102, any one of the control maps M1 to be used, from the control maps M1 belonging to the map group MG1. The selected control map M1 may correspond to the voltage of the DC power supplied from the battery 101 to the inverter 102. When the inverter controller 23 receives the notification instruction INS, the control map selector 25 may select, on the basis of the voltage of the DC power supplied from the battery 101 to the inverter 102, any of the control maps M2 to be used, from the control maps M2 belonging to the map group MG2. The selected control map M2 may correspond to the voltage of the DC power supplied from the battery 101 to the inverter 102. This allows the vehicle 100 to generate a sound or a vibration to notify the driver of information.

On the basis of the driver's operation received from the user interface UI of the navigation unit 17, for example, the control map editor 26 may edit the control maps M2 belonging to the map group MG2 held in the control map storage 24. In one example embodiment, the control map editor 26 may change the position of a boundary between the PWM control region RA and the overmodulation PWM control region RB and the position of a boundary between the overmodulation PWM control region RB and the rectangular wave control region RC in the control map M2. Additionally, the control map editor 26 may change the respective sizes of the subregions R1 to R7 and the respective carrier frequencies fc allocated to the subregions R1 to R7 in the control map MA illustrated in FIG. 3A, for example. The control map editor 26 may also change the respective carrier frequencies fc allocated to the PWM control region RA and the overmodulation PWM control region RB in the control map MB illustrated in FIG. 3B, for example. The control map editor 26 may change these parameters on the basis of the driver's operation within a range that does not affect the operation of the motor generator 103.

According to the configuration in some of the foregoing example embodiments, the vehicle control apparatus 1 may generate the notification instruction INS when the traveling speed of the vehicle 100 below the speed limit is approaching the speed limit or when the traveling speed of the vehicle 100 exceeds the speed limit. On the basis of the notification instruction INS, any one of the control maps M2 belonging to the map group MG2 may be selected. This allows the vehicle control apparatus 1 to generate a sound or a vibration to notify the driver of the approach of the traveling speed of the vehicle 100 to the speed limit, for example.

In one embodiment, the outside-vehicle camera 11 may serve as a "first imaging unit". In one embodiment, the in-vehicle camera 12 may serve as a "second imaging unit". In one embodiment, the inverter controller 23 may serve as an "inverter controller". In one embodiment, the motor generator 103 may serve as a "drive motor". In one embodiment, the inverter 102 may serve as an "inverter". In one embodiment, the speed judging unit 21 may serve as a "notification instruction generator". In one embodiment, the control map editor 26 may serve as a "control map generator". In one embodiment, the user interface UI may serve as "an operation unit". In one embodiment, the control maps M1 may serve as a "first control map". In one embodiment, the control maps M2 may serve as a "second control map".

[Example Operations and Effects]

Example operations and effects of the vehicle control apparatus 1 will now be described.

[Outline of Overall Operation]

An outline of the overall operation of the vehicle control apparatus 1 will now be described with reference to FIG. 2. The outside-vehicle camera 11 may capture an image of an environment in front of the vehicle 100. The image analyzer 13 may perform an image analyzing process on the basis of the image captured by the outside-vehicle camera 11. On the basis of the image captured by the outside-vehicle camera 11, the speed-limit data acquirer 14 of the image analyzer 13 may identify a traffic sign that is installed on the road on which the vehicle 100 is traveling and indicates the speed limit of the road. On the basis of the traffic sign identified, the speed-limit data acquirer 14 may acquire information on the speed limit. The position information acquirer 15 may acquire position information on a coordinate of the vehicle 100 on the ground through a GNSS, such as the GPS. The communication unit 16 may be coupled to a server that distributes, for example but not limited to, traffic information via wireless communication, such as LTE or a wireless LAN. The navigation unit 17 may determine, on the basis of the map information database DB accommodated therein, a traveling route to a destination along which the vehicle 100 is to travel, and may present the driver with the information on the traveling route to guide the vehicle 100 to travel along the determined traveling route. The speed-limit data acquirer 18 of the navigation unit 17 may acquire, on the basis of the map information database DB, the information on the speed limit of the road on which the vehicle 100 is traveling. The controller 20 may control the operations of the inverter 102, the brake mechanisms 114 and 124, the electronic control coupling 106, the battery 101, and another component on the basis of the results of the detections by the accelerator pedal sensor 91 and the brake pedal sensor 92.

The speed judging unit 21 of the controller 20 may judge the traveling speed of the vehicle 100 through comparing the traveling speed of the vehicle 100 with the speed limit of the road of the vehicle 100 acquired by the speed-limit data acquirers 14 and 18.

The motor controller 22 of the controller 20 may calculate, on the basis of the result of the detection by the accelerator pedal sensor 91, for example, the command value of the motor revolution number N of the motor generator 103 and the command value of the motor torque T of the motor generator 103. On the basis of the command value of the motor revolution number N and the command value of the motor torque T, the inverter controller 23 may control the inverter 102 using the control map M. The control map selector 25 in the inverter controller 23 may select any one of the control maps M to be used, from the control maps M held in the control map storage 24. On the basis of the driver's operation received from the user interface UI of the navigation unit 17, for example, the control map editor 26 may edit the control maps M2 belonging to the map group MG2 held in the control map storage 24.

[Details of Example Operation]

The speed judging unit 21 may judge the traveling speed of the vehicle 100 through comparing the traveling speed of the vehicle 100 with the speed limit of the road of the vehicle 100 acquired by the speed-limit data acquirers 14 and 18. The speed judging unit 21 may generate the notification instruction INS when the traveling speed of the vehicle 100 below the speed limit is approaching the speed limit or when the traveling speed of the vehicle 100 exceeds the speed limit. The inverter controller 23 may change the way of controlling the inverter 102 on the basis of the notification instruction INS.

Figure 6:
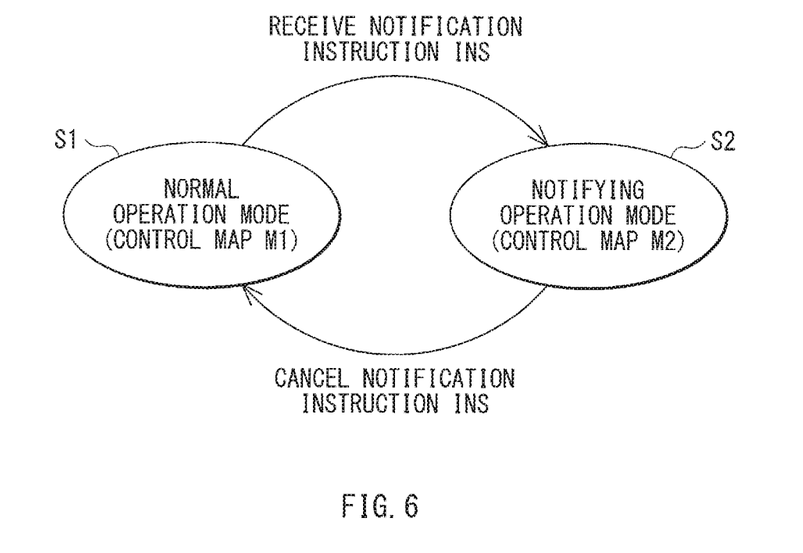
FIG. 6 is a mode transition diagram illustrating an example operation of an inverter controller illustrated in FIG. 2.

FIG. 6 illustrates an example mode transition of the inverter controller 23. The inverter controller 23 may work in operational modes including a normal operation mode S1 and a notifying operation mode S2. While being in the normal operation mode S1, the inverter controller 23 may control the inverter 102 on the basis of the control maps M1 belonging to the map group MG1. While being in the notifying operation mode S2, the inverter controller 23 may control the inverter 102 on the basis of the control maps M2 belonging to the map group MG2.

When receiving the notification instruction INS in the normal operation mode S1, the inverter controller 23 may transit from the normal operation mode S1 to the notifying operation mode S2. For example, the control map selector 25 may select, on the basis of the notification instruction INS, any one of the control maps M2 to be used, from the multiple control maps M2 belonging to the map group MG2 held in the control map storage 24. The selected control map M2 may correspond to the voltage of the DC power supplied from the battery 101 to the inverter 102. The inverter controller 23 may control the inverter 102 on the basis of the control map M or the control map M2 selected. The multiple control maps M2 may be configured to cause the vehicle 100 to generate a sound or a vibration larger than those generated on the basis of the control maps M1. This allows the vehicle 100 to generate a sound or a vibration to notify the driver when the traveling speed below the speed limit is approaching the speed limit or when the vehicle speed exceeds the speed limit.

When the notification instruction INS is cancelled while the inverter controller 23 is in the notifying operation mode S2, the inverter controller 23 may transit from the notifying operation mode S2 to the normal operation mode S1. For example, the control map selector 25 may select, on the basis of the cancellation of the notification instruction INS, any one of the control maps M1 to be used, from the multiple control maps M1 belonging to the map group MG1 held in the control map storage 24. The selected control map M1 may correspond to the voltage of the DC power supplied from the battery 101 to the inverter 102. The inverter controller 23 may control the inverter 102 on the basis of the control map M or the control map M1 selected.

In this manner, the vehicle control apparatus 1 may change the way of controlling the inverter 102 on the basis of the notification instruction INS to properly notify the driver of information. Meanwhile, for example, information displayed on an instrument panel might not be seen by the driver. Such displaying on the instrument panel thus might lead to a failure in notifying the driver of the information. An alarm sound notifying the driver of minor information with low urgency might cause the driver to have a feeling of repulsion for the alarm sound. To address such example concerns, the vehicle control apparatus 1 according to some of the example embodiments may change the way of controlling the inverter 102 on the basis of the notification instruction INS. For example, the vehicle control apparatus 1 may control the inverter 102 on the basis of the control map that causes the vehicle 100 to generate a large sound or a large vibration on the basis of the notification instruction INS. This allows the vehicle control apparatus 1 to readily notify the driver of the information without the use of visual notification. Additionally, the sound or vibration generated by the vehicle 100 may be adjusted to an appropriate level, for example. This reduces the occurrence of the feeling of repulsion of the driver. Accordingly, it is possible for the vehicle control apparatus 1 to properly notify the driver of the information to be notified, for example, when the information is minor information with low urgency.

Furthermore, the vehicle control apparatus 1 may change the way of controlling of the inverter 102 when the traveling speed of the vehicle 100 below the speed limit is approaching the speed limit or when the traveling speed of the vehicle 100 exceeds the speed limit. This allows the vehicle control apparatus 1 of the vehicle 100 to generate a sound or a vibration to call the driver's attention to the traveling speed. Unlike the notification with an alarm sound, for example, the notification with the sound or vibration generated by the vehicle 100 reduces the occurrence of the feeling of repulsion of the driver while calling the driver's attention.

Moreover, the vehicle control apparatus 1 may include the control map editor 26 that allows the driver to edit the multiple control maps M2 belonging to the map group MG2 held in the control map storage 24. This allows the vehicle 100 to generate a sound or a vibration adjusted to an appropriate level in the notifying operation mode S2. In one example, the control maps M2 may be edited so that a sound is generated which is adjusted in loudness or frequency. In another example, the control maps M2 may be edited to generate a sound having a frequency increasing stepwise or a sound with a scale upon acceleration, for example. This reduces the occurrence of the feeling of the repulsion of the driver for the sound or vibration generated by the vehicle 100. Accordingly, it is possible to properly notify the driver of information.

[Example Effects]

In some of the foregoing example embodiments of the technology, the way of controlling the inverter is changed on the basis of the notification instruction. Accordingly, it is possible to properly notify the driver of information.

In one foregoing example embodiment, the control map editor may be provided with which the driver is allowed to edit the multiple control maps M2 belonging to the map group MG2 held in the control map storage. Through the editing of the control maps M2, the sound or vibration generated by the vehicle in the notifying operation mode are adjusted to an appropriate level. Accordingly, it is possible to properly notify the driver of information.

Modification Examples

In some of the foregoing example embodiments, the way of controlling the inverter 102 may be changed on the basis of the information on the traveling speed. However, example embodiments of the technology should not be limited to the foregoing example embodiments. Some modification examples of the vehicle control apparatus are described in detail below.

Figure 7:
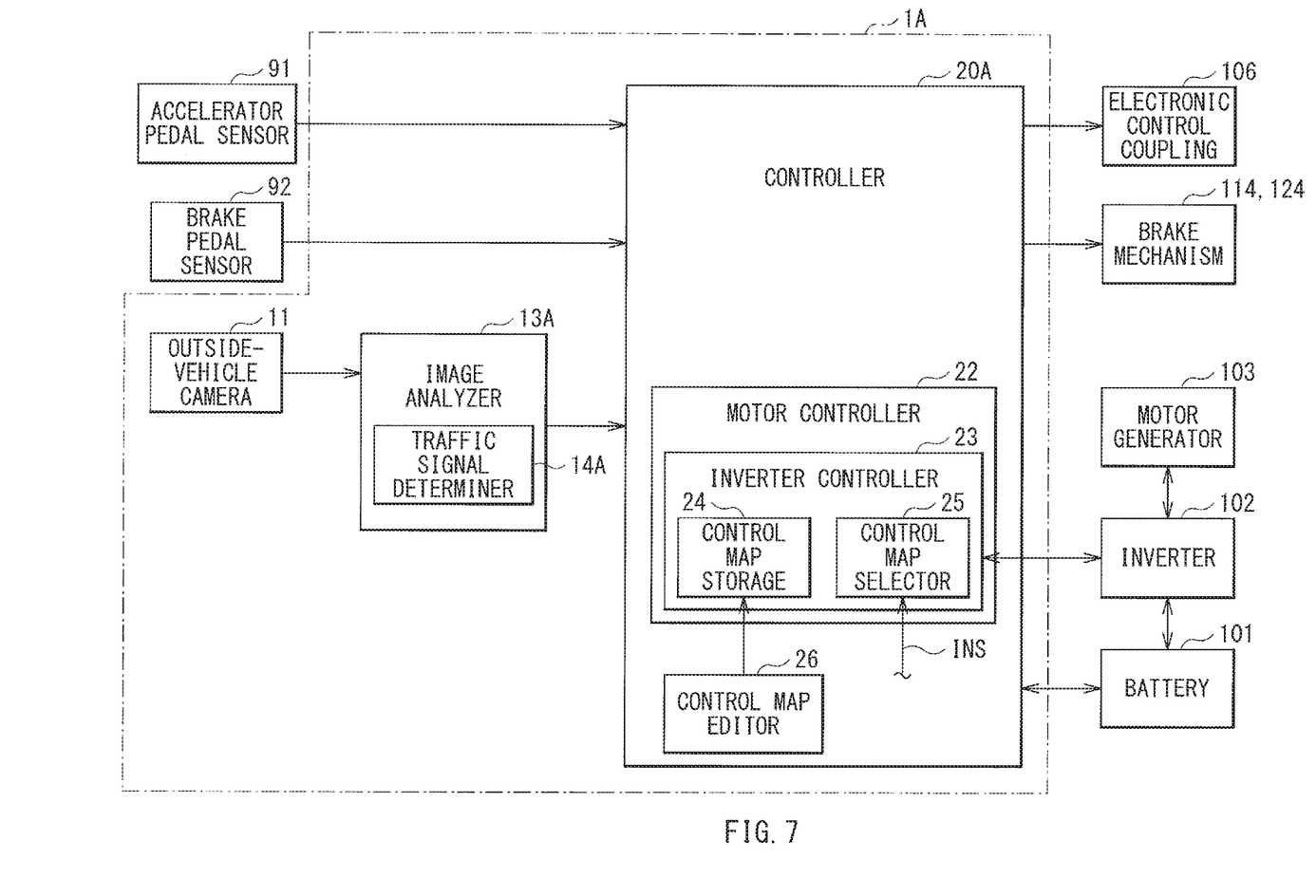
FIG. 7 is a block diagram illustrating an example configuration of a vehicle control apparatus according to one modification example.

FIG. 7 illustrates an example configuration of a vehicle control apparatus 1A according to one modification example. The vehicle control apparatus 1A may change the way of controlling the inverter 102 on the basis of information on an indicator of a traffic light installed in front of the vehicle 100. The vehicle control apparatus 1A may include an outside-vehicle camera 11, an image analyzer 13A, and a controller 20A.

The image analyzer 13A may include a traffic signal determiner 14A. The traffic signal determiner 14A may identify, on the basis of an image captured by the outside-vehicle camera 11, a traffic light installed in front of the vehicle 100 traveling on the road. The traffic signal determiner 14A may determine the condition of the indicator of the traffic light identified. For example, the traffic signal determiner 14A may determine whether the identified traffic light indicates a green signal (or green light) that permits vehicles to travel or a red signal (or red light) that prohibits vehicles from traveling. When the traffic light indicates the red signal that prohibits vehicles from traveling, the traffic signal determiner 14A may supply the notification instruction INS to the controller 20A. Afterwards, when the indicator of the the traffic light is switched from the red signal to the green signal that permits vehicles to travel, the traffic signal determiner 14A may cancel the notification instruction INS. In one embodiment, the traffic signal determiner 14A may serve as the "notification instruction generator".

The controller 20A may be similar to the controller 20 illustrated in FIG. 2 according to one example embodiment except that the controller 20A does not include the speed judging unit 21.

The traffic signal determiner 14A may identify, on the basis of an image captured by the outside-vehicle camera 11, a traffic light installed in front of the vehicle 100 traveling on the road. The traffic signal determiner 14A may determine the condition of the indicator of the traffic light identified. When the traffic light indicates a red signal prohibiting vehicles from traveling, the traffic signal determiner 14A may supply the notification instruction INS to the controller 20A.

On the basis of the notification instruction INS, the control map selector 25 may select any one of the control maps M2 to be used, from the control maps M2 belonging to the map group MG2. The inverter controller 23 may control the inverter 102 on the basis of the control map M2 selected. This allows the vehicle 100 to generate a sound or a vibration to notify the driver when the traffic light in front of the vehicle 100 indicates a red signal that prohibits vehicles from traveling, thereby calling the driver's attention to the red signal.

In this modification example, the vehicle control apparatus 1A may change the way of controlling the inverter 102 when a traffic light in front of the vehicle 100 indicates a red signal prohibiting vehicles from traveling. However, example embodiments of the technology should not be limited to this example modification. In another example embodiment, the vehicle control apparatus 1A may change the way of controlling the inverter 102 in a condition where the traffic light in front of the vehicle 100 indicates a red signal prohibiting vehicles from traveling and vehicle 100, where the speed of the vehicle 100 exceeds a predetermined speed, and where the driver does not operate the brake pedal.

Figure 8:
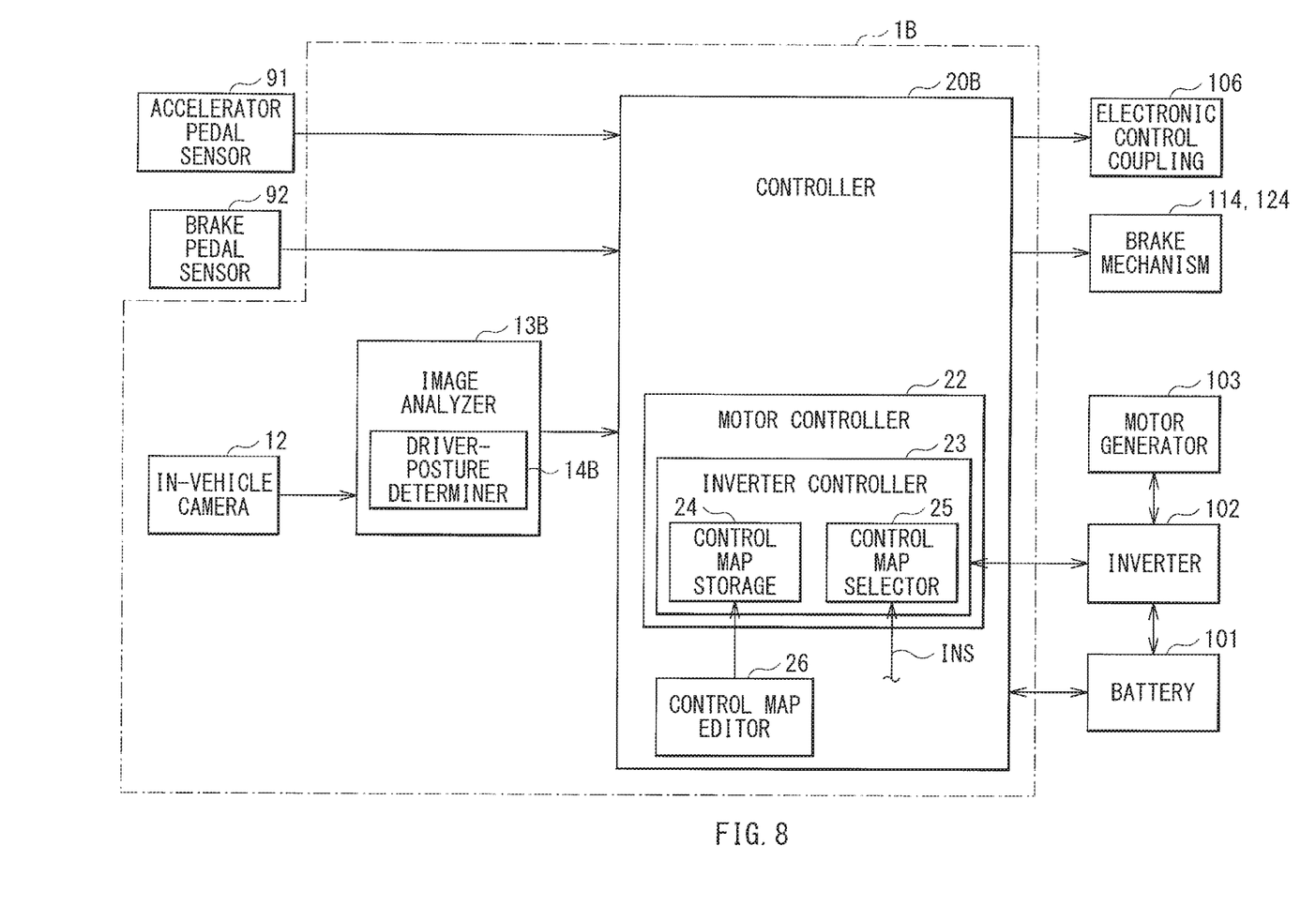
FIG. 8 is a block diagram illustrating an example configuration of a vehicle control apparatus according to another modification example.

FIG. 8 illustrates another example configuration of a vehicle control apparatus 1B according to one modification example. The vehicle control apparatus 1B may change the way of controlling the inverter 102 on the basis of information on the posture of the driver of the vehicle 100. The vehicle control apparatus 1B may include an in-vehicle camera 12, an image analyzer 13B, and a controller 20B.

The in-vehicle camera 12 may be installed on the interior of the vehicle 100, and may capture an image of the driver of the vehicle 100.

The image analyzer 13B may perform an image analyzing process on the basis of the image captured by the in-vehicle camera 12. The image analyzer 13B may include a driver-posture determiner 14B. The driver-posture determiner 14B may determine the posture of the driver of the vehicle 100 on the basis of the image captured by the in-vehicle camera 12. For example, the driver-posture determiner 14B may determine whether the driver faces in a forward direction or a direction other than the front direction. When the driver faces in a direction other than the front direction, the driver-posture determiner 14B may supply the notification instruction INS to the controller 20B. When the driver faces in the front direction afterwards, the driver-posture determiner 14B may cancel the notification instruction INS. In one embodiment, the driver-posture determiner 14B may serve as the "notification instruction generator".

The controller 20B may have a configuration similar to the controller 20 illustrated in FIG. 2 according to one example embodiment except that the controller 20B does not include the speed judging unit 21.

The driver-posture determiner 14B may determine the posture of the driver of the vehicle 100 on the basis of the image captured by the in-vehicle camera 12. When the driver faces in a direction other than the front direction, the driver-posture determiner 14B may supply the notification instruction INS to the controller 20B.

On the basis of the notification instruction INS, the control map selector 25 of the controller 20B may select any one of the control maps M2 to be used, from the control maps M2 belonging to the map group MG2. The inverter controller 23 may control the inverter 102 on the basis of the control map M2 selected. This allows the vehicle 100 to generate a sound or a vibration to notify the driver when the driver faces in a direction other than the front direction, thereby calling the driver's attention.

Figure 9:
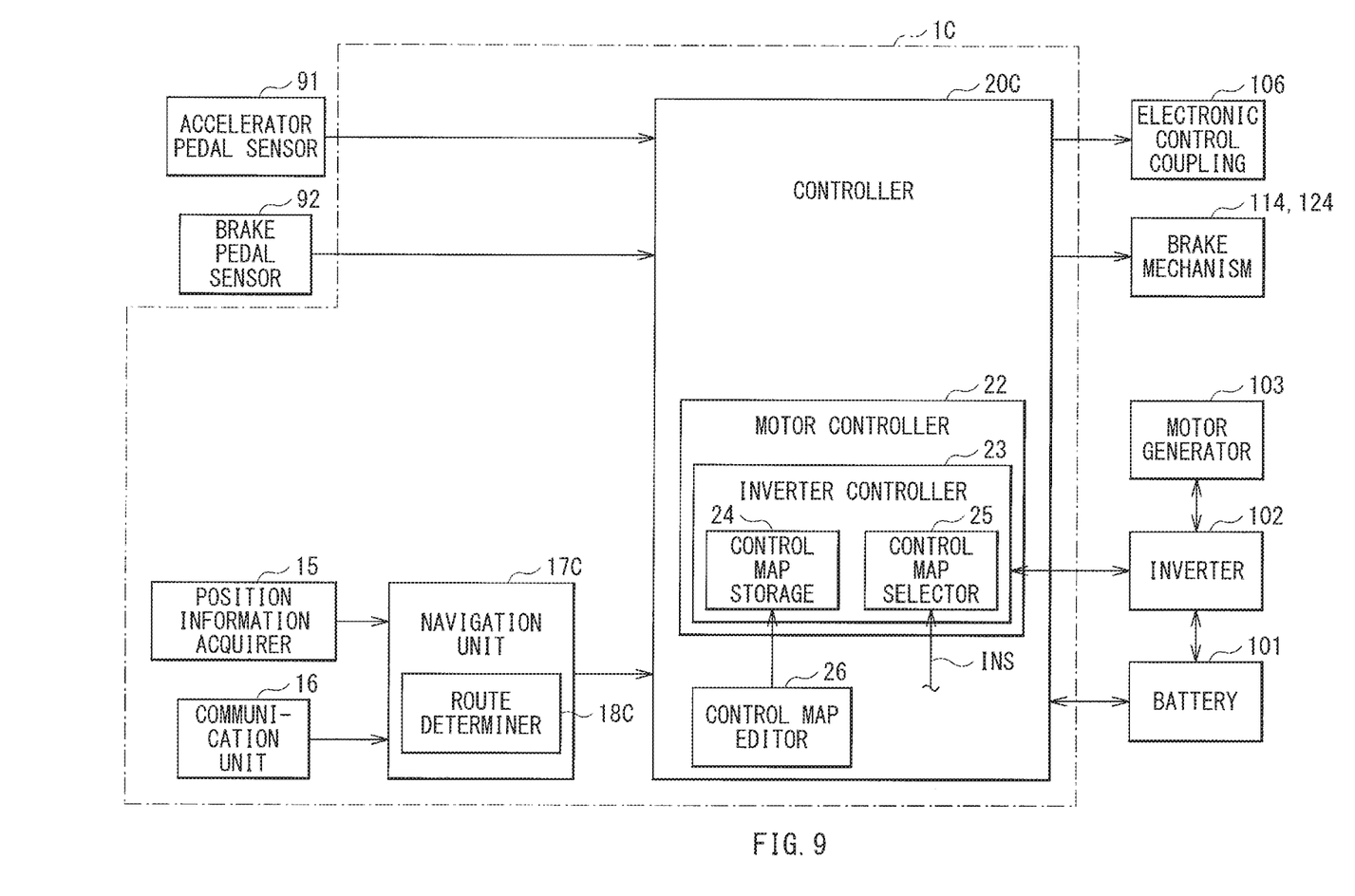
FIG. 9 is a block diagram illustrating an example configuration of a vehicle control apparatus according to still another modification example.

FIG. 9 illustrates another example configuration of a vehicle control apparatus 1C according to one modification example. The vehicle control apparatus 1C may change the way of controlling the inverter 102 on the basis of information on the traveling route along which the vehicle 100 is traveling (hereinafter referred to as a "traveling route of the vehicle 100"). The vehicle control apparatus 1C may include the position information acquirer 15, the communication unit 16, a navigation unit 17C, and a controller 20C.

The navigation unit 17C may include a route determiner 18C. The route determiner 18C may determine, on the basis of position information acquired by the position information acquirer 15, a deviation of the traveling route of the vehicle 100 from the route determined by the navigation unit 17C. When the traveling route of the vehicle 100 deviates from the route determined by the navigation unit 17C, the route determiner 18C may supply the notification instruction INS to the controller 20C. When the traveling route of the vehicle 100 comes back to coincide with the route determined by the navigation unit 17C afterwards, the route determiner 18C may cancel the notification instruction INS. In one embodiment, the route determiner 18C may serve as the "notification instruction generator".

The controller 20C may have a configuration similar to the controller 20 illustrated in FIG. 2 according to one example embodiment except that the controller 20C does not include the speed judging unit 21.

The route determiner 18C may determine, on the basis of the position information acquired by the position information acquirer 15, whether the traveling route of the vehicle 100 deviates from the route determined by the navigation unit 17C. When the traveling route of the vehicle 100 deviates from the route determined by the navigation unit 17C, the route determiner 18C may supply the notification instruction INS to the controller 20C.

On the basis of the notification instruction INS, the control map selector 25 of the controller 20C may select any one of the control maps M2 to be used, from the control maps M2 belonging to the map group MG2. The inverter controller 23 may control the inverter 102 on the basis of the control map M2 selected. This allows the vehicle 100 to generate a sound or a vibration to notify the driver of the deviation of the traveling route of the vehicle 100 from the route determined by the navigation unit 17C, thereby calling the driver's attention.

Figure 10:
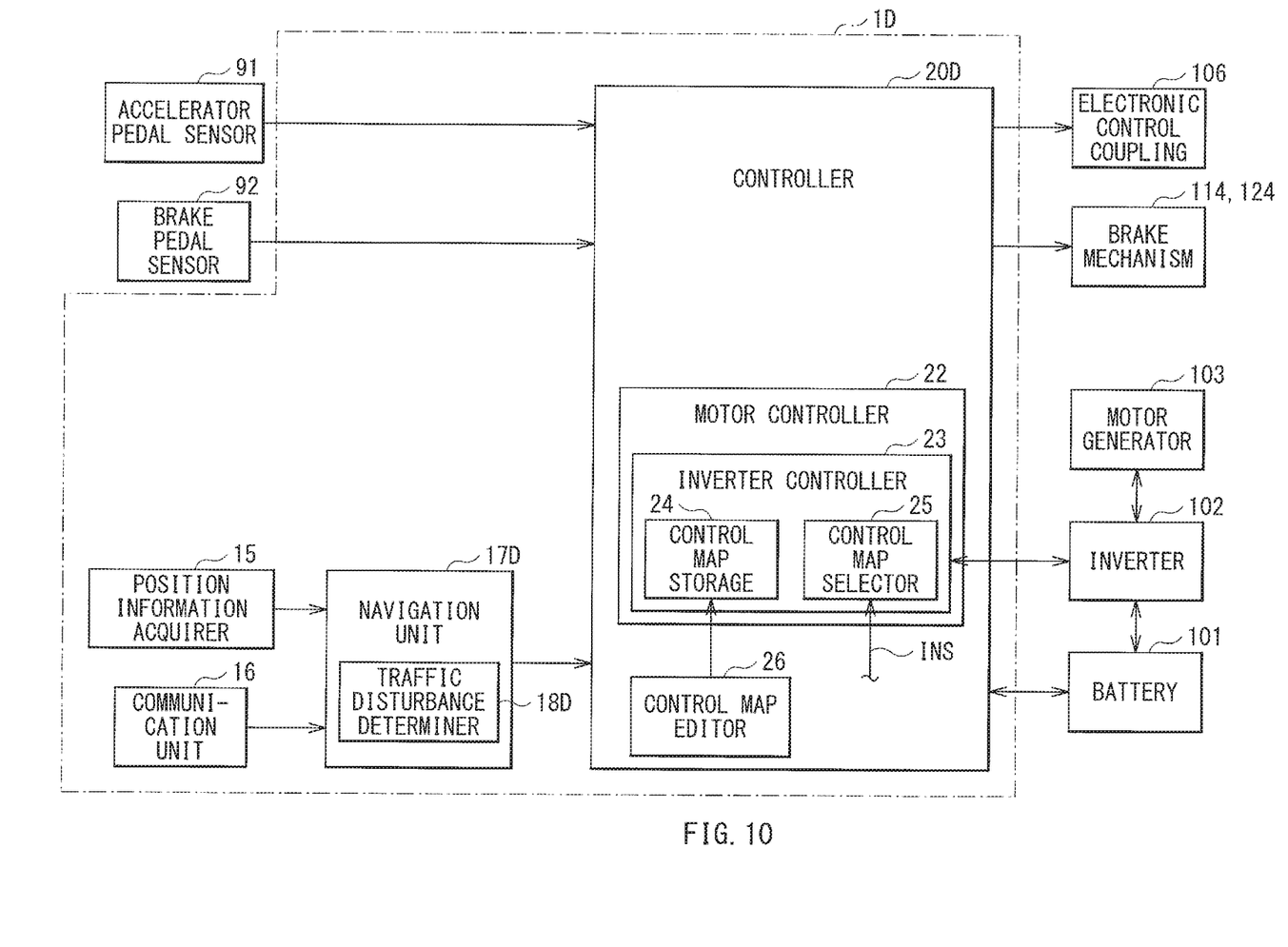
FIG. 10 is a block diagram illustrating an example configuration of a vehicle control apparatus according to yet another modification example.

FIG. 10 illustrate another example configuration of a vehicle control apparatus 1D according to one modification example. The vehicle control apparatus 1D may change the way of controlling the inverter 102 on the basis of information on a traffic disturbance, such as a traffic congestion or a traffic closure, ahead of the vehicle 100. The vehicle control apparatus 1D may include the position information acquirer 15, the communication unit 16, a navigation unit 17D, and a controller 20D.

The navigation unit 17D may include a traffic disturbance determiner 18D. The traffic disturbance determiner 18D may determine, on the basis of traffic information received by the communication unit 16, whether a traffic disturbance, such as a traffic congestion or a traffic closure, occurs ahead of the vehicle 100 on the traveling route of the vehicle 100. When the traffic disturbance occurs, the traffic disturbance determiner 18D may supply the notification instruction INS to the controller 20D. When the traffic disturbance occurring ahead of the vehicle 100 is relieved afterwards, the traffic disturbance determiner 18D may cancel the notification instruction INS. In one embodiment, the traffic disturbance determiner 18D may serve as the "notification instruction generator".

The controller 20D may have a configuration similar to the controller 20 according to one example embodiment except that the controller 20D does not include the speed judging unit 21.

The traffic disturbance determiner 18D may determine, on the basis of the traffic information received by the communication unit 16, whether a traffic disturbance, such as a traffic congestion or a traffic closure, occurs ahead of the vehicle 100 on the traveling route of the vehicle 100. When the traffic disturbance occurs ahead of the vehicle 100, the traffic disturbance determiner 18D may supply the notification instruction INS to the controller 20D.

On the basis of the notification instruction INS, the control map selector 25 of the controller 20D may select any one of the control maps M2 to be used, from the control maps M2 belonging to the map group MG2. The inverter controller 23 may control the inverter 102 on the basis of the control map M2 selected. This allows the vehicle 100 to generate a sound or a vibration to notify the driver of the occurrence of the traffic disturbance ahead of the vehicle 100, thereby calling the driver's attention.

Although some modification examples of the example embodiment of the technology are described above with reference to the four vehicle control apparatuses 1A to 1D, modification examples of the example embodiment of the technology should not be limited to the modification examples described above. In another modification example, the way of controlling the inverter 102 may be changed depending on various pieces of information to be informed to the driver. In still another example modification, two or more of these modification examples may be combined. In this modification example, different control maps M may be provided for different pieces of information to be notified. For example, the control map M configured to cause a large sound to be generated may be used to notify the driver of the information on the traveling speed of the vehicle 100. In another example, a control map M configured to cause a large vibration to be generated may be used to notify the driver of the information on the indicator of the traffic light in front of the vehicle 100.

Although some example embodiments of the technology are described hereinabove, the foregoing embodiments are mere examples and are not intended to limit the scope of the technology.

In some of the foregoing example embodiments, the battery 101 may supply a DC power to the inverter 102. The foregoing example embodiments, however, are non-limiting examples. In an alternative example embodiment, a DC/DC converter may be provided between the battery 101 and the inverter 102. In this example embodiment, a DC power may be supplied from the battery 101 to the DC/DC converter, and may be converted at the DC/DC converter. The converted DC power may be then supplied to the inverter 102.

The foregoing example embodiments of the technology may be applied to electric vehicles. The application of the example embodiments of the technology, however, is not limited to the electric vehicles. For example, the example embodiments of the technology may be applied to other vehicles such as hybrid vehicles.

In some of the foregoing example embodiments, the way of controlling the inverter 102 may be changed to notify the driver of information when information is not displayed on an instrument panel or when an alarm sound is not generated. The foregoing example embodiments, however, are non-limiting examples. In an alternative example embodiment, a control map M configured to cause a large vibration to be generated may be used when the information is not displayed on the instrument panel, and a control map configured to cause a large sound to be generated may be used when an alarm sound is generated to notify the driver of information.

Effects of the example embodiments and modification examples of any of the example embodiments of the technology are non-limiting examples of the effects provided by the technology, and other effects may be provided. The use of the terms first, second, etc. does not denote any order or importance, but rather the terms first, second, etc. are used to distinguish one element from another. It should be appreciated that modifications and alterations of the novel method and apparatus described herein may be made. It should be also appreciated that various omissions, replacements, and modifications may be made in the method and the apparatus described herein, without departing from the scope of the spirit of the technology. The technology is intended to include such modifications and alterations in so far as they fall within the scope of the appended claims or the equivalents thereof.

The invention claimed is:

1. A vehicle control apparatus that controls a vehicle, the vehicle control apparatus comprising:
an inverter controller configured to
hold a plurality of control maps for an inverter that supplies electric power to a drive motor, the drive motor being configured to drive a drive wheel of the vehicle, the plurality of control maps including information on a correspondence relation of data on a motor torque of the drive motor and data on a number of revolutions of the drive motor versus control modes of the inverter,
select any one of the plurality of control maps on a basis of a notification instruction that instructs to notify a driver of information, and
control an operation of the inverter on a basis of the any one of the control maps selected.

2. The vehicle control apparatus according to claim 1, further comprising
a notification instruction generator configured to generate the notification instruction on a basis of one or more of:
information received from a navigation unit that determines a route along which the vehicle is to travel;
information received from a first imaging unit that captures an image of external environment around the vehicle; and
information received from a second imaging unit that captures an image of an interior of the vehicle.

3. The vehicle control apparatus according to claim 2, wherein the notification instruction generator is configured to
acquire information on a speed limit of a road on which the vehicle is traveling, and
generate the notification instruction on a basis of the speed limit and a traveling speed of the vehicle.

4. The vehicle control apparatus according to claim 2, wherein the notification instruction generator is configured to
detect a posture of the driver on a basis of the image captured by the second imaging unit, and
generate the notification instruction on a basis of the posture of the driver detected.

5. The vehicle control apparatus according to claim 2, wherein the notification instruction generator is configured to generate the notification instruction on a basis of a traveling route of the vehicle and the route determined by the navigation unit.

6. The vehicle control apparatus according to claim 2, wherein
the navigation unit is configured to acquire information on a traffic disturbance occurring ahead of the vehicle on the traveling route of the vehicle, and
the notification instruction generator is configured to generate the notification instruction on a basis of the information on the traffic disturbance.

7. The vehicle control apparatus according to claim 2, wherein the notification instruction generator is configured to
detect, on a basis of the image captured by the first imaging unit, an indicator of a traffic light installed ahead of the vehicle, and
generate the notification instruction on a basis of the indicator of the traffic light detected.

8. The vehicle control apparatus according to claim 1, wherein
the plurality of control maps includes a first control map and a second control map,
the vehicle is caused to generate a larger sound when the operation of the inverter is controlled on a basis of the second control map than when the operation of the inverter is controlled on a basis of the first control map,
the inverter controller is configured to control the operation of the inverter on a basis of the first control map when not receiving the notification instruction, and
the inverter controller is configured to control the operation of the inverter on a basis of the second control map when receiving the notification instruction.

9. The vehicle control apparatus according to claim 1, wherein
the plurality of control maps includes a first control map and a second control map,
the vehicle is caused to generate a larger vibration when the operation of the inverter is controlled on a basis of the second control map than when the operation of the inverter is controlled on a basis of the first control map,
the inverter controller is configured to control the operation of the inverter on a basis of the first control map when not receiving the notification instruction, and
the inverter controller is configured to control the operation of the inverter on a basis of the second control map when receiving the notification instruction.

10. The vehicle control apparatus according to claim 1, further comprising:
an operation unit configured to receive an instruction from the driver; and
a control map generator configured to generate one or more of the plurality of control maps on a basis of the instruction received from the operation unit.

11. The vehicle control apparatus according to claim 1, wherein the notification instruction is configured to instruct the driver to pay attention to the information notified.

12. A vehicle control apparatus that controls a vehicle, the vehicle control apparatus comprising:
an inverter controller configured to
hold a plurality of control maps for an inverter that supplies electric power to a drive motor, the drive motor being configured to drive a drive wheel of the vehicle,
select any one of the plurality of control maps on a basis of a notification instruction that instructs to notify a driver of information, and
control an operation of the inverter on a basis of the any one of the control maps selected,
wherein the plurality of control maps includes a first control map and a second control map,
wherein the vehicle is caused to generate a larger sound when the operation of the inverter is controlled on a basis of the second control map than when the operation of the inverter is controlled on a basis of the first control map,
wherein the inverter controller is configured to control the operation of the inverter on a basis of the first control map when not receiving the notification instruction, and
wherein the inverter controller is configured to control the operation of the inverter on a basis of the second control map when receiving the notification instruction.

13. A vehicle control apparatus that controls a vehicle, the vehicle control apparatus comprising:
an inverter controller configured to
hold a plurality of control maps for an inverter that supplies electric power to a drive motor, the drive motor being configured to drive a drive wheel of the vehicle,
select any one of the plurality of control maps on a basis of a notification instruction that instructs to notify a driver of information, and
control an operation of the inverter on a basis of the any one of the control maps selected,
wherein the plurality of control maps includes a first control map and a second control map,
wherein the vehicle is caused to generate a larger vibration when the operation of the inverter is controlled on a basis of the second control map than when the operation of the inverter is controlled on a basis of the first control map,
wherein the inverter controller is configured to control the operation of the inverter on a basis of the first control map when not receiving the notification instruction, and
wherein the inverter controller is configured to control the operation of the inverter on a basis of the second control map when receiving the notification instruction.

* * * * *